United States Patent
Sato et al.

(10) Patent No.: US 7,677,999 B2
(45) Date of Patent: Mar. 16, 2010

(54) CHAIN TENSIONER

(75) Inventors: Seiji Sato, Iwata (JP); Satoshi Kitano, Iwata (JP); Hisashi Hayakawa, Iwata (JP)

(73) Assignee: NTN Corporation, Osaka (JP)

( * ) Notice: Subject to any disclaimer, the term of this patent is extended or adjusted under 35 U.S.C. 154(b) by 1073 days.

(21) Appl. No.: 11/247,254

(22) Filed: Oct. 12, 2005

(65) Prior Publication Data

US 2006/0094548 A1 May 4, 2006

(30) Foreign Application Priority Data

Oct. 28, 2004 (JP) ............................. 2004-314195
Jan. 4, 2005 (JP) ............................. 2005-000134

(51) Int. Cl.
*F16H 7/08* (2006.01)
*F16H 7/22* (2006.01)

(52) U.S. Cl. ...................... 474/109; 474/110

(58) Field of Classification Search ................ 474/109, 474/110, 111
See application file for complete search history.

(56) References Cited

U.S. PATENT DOCUMENTS

| | | | |
|---|---|---|---|
| 5,035,680 A | | 7/1991 | Ojima |
| 5,378,202 A | * | 1/1995 | Swinderman ................. 474/92 |
| 5,967,923 A | * | 10/1999 | Petri ........................... 474/138 |
| 6,860,382 B2 | * | 3/2005 | Wiedenheft ................. 198/813 |
| 7,186,923 B2 | * | 3/2007 | Thorn et al. ................. 174/257 |
| 2003/0139235 A1 | * | 7/2003 | Yamamoto et al. .......... 474/109 |
| 2004/0266571 A1 | * | 12/2004 | Izutsu et al. ................. 474/110 |

FOREIGN PATENT DOCUMENTS

| | | | |
|---|---|---|---|
| EP | 1 411 271 | | 4/2004 |
| JP | 08004861 A | * | 1/1996 |
| JP | 2001-355691 | | 12/2001 |
| JP | 2003-202060 | | 7/2003 |
| WO | WO 03038306 A1 | * | 5/2003 |

* cited by examiner

*Primary Examiner*—Robert A Siconolfi
*Assistant Examiner*—Robert T Reese
(74) *Attorney, Agent, or Firm*—Wenderoth, Lind & Ponack, L.L.P.

(57) ABSTRACT

A chain tensioner includes a housing defining a cylinder chamber, and a plunger having a small-diameter end and a spring both mounted in the cylinder chamber. A register ring is fitted in a ring-receiving groove formed in the inner periphery of the cylinder chamber near its open end. A plurality of annular grooves are formed in the outer periphery of the plunger so as to be axially spaced from each other at equal intervals. The register ring is adapted to be press-fitted in one of the annular grooves. With the register ring trapped between an engaging surface of a first annular groove which is one of the annular grooves located nearest to the front end of the plunger and a locking surface of the ring-receiving groove, an outer cylindrical surface of the plunger extending forwardly from the first annular groove has its front portion supported by an inner cylindrical surface of the cylinder chamber extending forwardly from the ring-receiving groove.

9 Claims, 6 Drawing Sheets

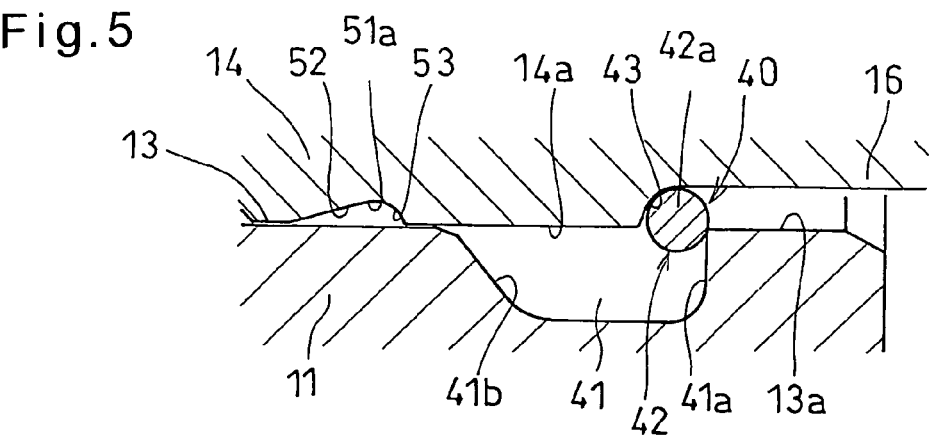
Fig.5
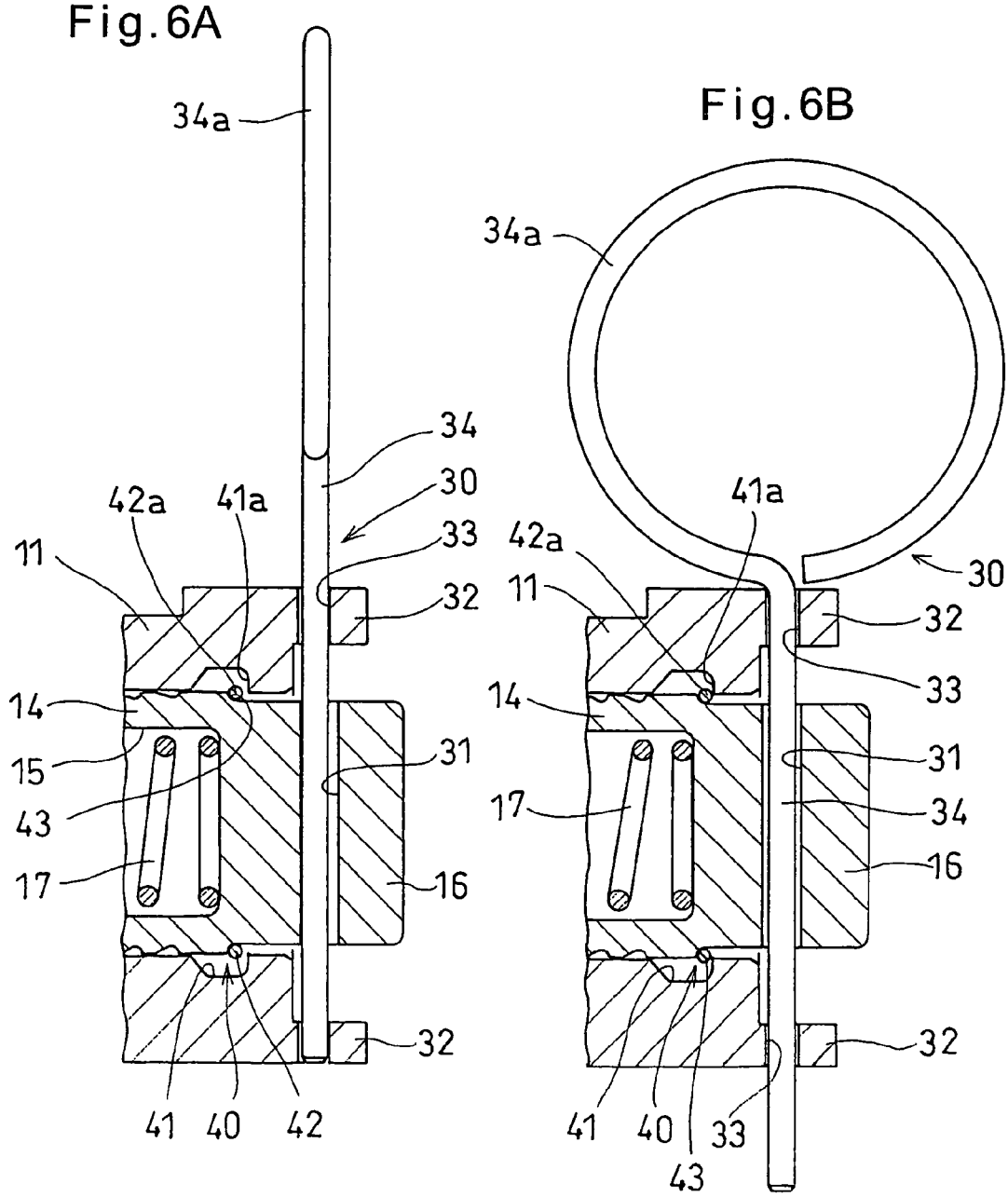
Fig.6A
Fig.6B

CHAIN TENSIONER

BACKGROUND OF THE INVENTION

This invention relates to a chain tensioner for keeping a constant tension of a chain such as a camshaft driving chain in an internal combustion engine.

Typically, a chain transmission system for driving camshafts of a vehicle engine includes a chain tensioner for applying pressure to the slack side of the camshaft driving chain to keep a constant tension in the chain.

A typical conventional chain tensioner comprises a housing formed with a cylinder chamber, a plunger slidably received in the cylinder chamber, and a spring mounted in the cylinder chamber and biasing the plunger out of the cylinder chamber. The plunger defines a damper chamber in the housing. The housing is formed with an oil supply passage through which hydraulic oil is supplied into the damper chamber. A check valve is provided at the outlet of the oil supply passage. Hydraulic oil supplied into the damper chamber through the oil supply passage dampens the force applied to the plunger.

When the engine is stopped, according to the positions of the cams when the engine is stopped, the chain may remain in a tensioned state. The chain will thus push the plunger rather deeply into the cylinder chamber after the engine has stopped. When the engine is restarted with the plunger deeply pushed into the cylinder chamber, the plunger will advance abruptly for a rather long distance. However, because a hydraulic pump for supplying hydraulic oil into the damper chamber through the oil supply passage has just been started, it cannot fill the damper chamber, of which the volume is quickly increasing, with oil at a sufficient speed. This may cause the inclusion of air in the damper chamber. Air in the damper chamber will greatly deteriorate the function of the chain tensioner as a damper. Noise may result, too.

The chain tensioner disclosed in JP patent publication 2001-355691A includes means for obviating this problem. Specifically, as shown in FIGS. 11 to 14, this chain tensioner includes a housing 71 defining a cylinder chamber 72 formed with a ring-receiving groove 73 in its inner periphery near its open end. A radially and resiliently deformable register ring 74 is received in the ring-receiving groove 73. A plunger 76 is slidably mounted in the cylinder chamber 72 and is biased outwardly by a spring 75. In the outer cylindrical surface of the plunger 76, a plurality of annular grooves 77 are formed so as to be axially spaced from each other at equal intervals. Each annular groove 77 comprises a rear tapered surface 77a of which the diameter decreases gradually toward the front end of the plunger, and a front engaging surface 77b extending from the front small-diameter end of the tapered surface toward the front end of the plunger. The ring-receiving groove 73 includes a locking surface 73a at its rear portion. The engaging surface 77b of any of the annular grooves 77 and the locking surface 73a are capable of trapping the register ring 74 therebetween, thereby preventing retraction of the plunger 76.

Further, in order that this chain tensioner can be mounted easily, the plunger 76 has a small-diameter portion 78 at its front end, thereby defining a set surface 79 at the boundary between the small-diameter portion 78 and the rear large-diameter outer cylindrical surface 78a. By trapping the register ring 74 between the set surface 79 and a stop surface 73b formed at the front portion of the ring-receiving groove 73, the plunger 76 can be kept pushed in the cylinder chamber.

Once this chain tensioner is mounted, the register ring 74 is radially expanded to unlock the plunger 76. The plunger 76 is thus pushed outwardly by the spring 75, thereby pressing a pivotable chain guide 80 against a chain 81. The chain 81 is thus kept in a tensioned state.

If the chain guide 80 is simply pushed by the plunger 76, the chain guide 80 may move laterally due to vibration of the chain. In order to check such lateral movement of the chain guide, the chain guide 80 is formed with a guide groove 82 in which the small-diameter portion 78 of the plunger 76 is received.

When the register ring 74 is radially expanded to disengage it from the set surface 79, the plunger 76 will move outwardly under the force of the spring 75, so that as shown in FIG. 12, the register ring 74 will engage in the frontmost one of the annular grooves 77 (which is hereinafter called the first annular groove). In this state, due to changes in the tension of the chain resulting from fluctuations in the torque of the camshafts, the chain 81 vibrates, thereby causing the plunger 76 to repeatedly move back and forth as shown in FIGS. 11 to 13.

In this arrangement, if the outer cylindrical surface 78a extending from the outer (rear) edge 79a of the set surface 79 to the first annular groove 77 is short in axial length, while the plunger 76 is moving back and forth, the outer cylindrical surface 78a may separate from the inner cylindrical surface 72a of the cylinder chamber 72 extending forwardly from the ring-receiving groove 73, as shown in FIGS. 13 and 14. When the plunger 76 is pushed into the cylinder chamber 72 in this state, the plunger 76 tends to incline, which will promote wear of the inner peripheral surface of the cylinder chamber 72 and the outer cylindrical surface 76a of the plunger 76 and may also impair operation of the register ring 74.

Also, when the plunger 76 advances under the force of the spring 75, the edge 79a of the set surface 79 will abut the inner (front) edge 73b' of the stop surface 73b of the ring-receiving groove 73, impairing smooth movement of the plunger 76.

Among chain tensioners having means for restricting retraction of the plunger 76, there are ones in which the set surface 79 shown in FIG. 12 is omitted, and instead, the plunger is formed with a small-diameter portion at the front end thereof for preventing lateral movement of the chain guide 80, the small-diameter portion connecting with the rear large-diameter portion of the plunger through an inclined surface. In such chain tensioners, too, if the cylindrical surface of the plunger 76 extending between the outer edge of the inclined surface and the first annular groove is short, the same problems as mentioned above may arise.

In any of the abovementioned conventional chain tensioners, since the plunger 76 is always biased outwardly of the cylinder chamber by the spring 75, when mounting such a chain tensioner, it is necessary to fix the housing 71 to an engine block with the plunger 76 kept pushed into the housing. Thus, it was extremely troublesome to mount conventional chain tensioners to engine blocks.

A chain tensioner has been proposed which is free of this problem. That is, this tensioner is formed with radial pin holes in the front end of the plunger and the front end of the housing. With the plunger pushed into the housing until the pin hole formed in the plunger aligns with the pin holes formed in the housing, a set pin is inserted through the pin holes to keep the plunger pushed in the housing. After the chain tensioner has been mounted on an engine block, the pin is removed to let the plunger advance under the force of the spring, thereby applying tension to the chain.

But if an operator forgets to remove the set pin after mounting the chain tensioner on the engine block, the plunger is kept retracted in the housing. The chain tensioner therefore cannot perform its expected function.

Since an engine cover can be mounted on the engine block thereafter even if the set pin remains in the chain tensioner, once an operator forgets to remove the pin, he may leave the pin in the chain tensioner, not knowing this fact.

A first object of the present invention is to provide a chain tensioner which can minimize the wear of the sliding surfaces of the cylinder chamber and the plunger, and ensures smooth sliding movement of the plunger and unhindered operation of the register ring.

A second object of the invention is to provide a chain tensioner including means for preventing an operator from forgetting to remove the set pin after the chain tensioner has been mounted.

SUMMARY OF THE INVENTION

According to the present invention, there is provided a chain tensioner comprising a housing defining a cylinder chamber having an opening at a front end of the housing and configured to be mounted on an engine block, a plunger slidably mounted in the cylinder chamber and having a small-diameter portion at a front end thereof, a spring mounted in the cylinder chamber and biasing the plunger out of the cylinder chamber through the opening, and a resiliently and radially deformable register ring received in a ring-receiving groove formed in an inner periphery of the cylinder chamber near the opening, the plunger having a plurality of annular grooves formed in an outer periphery thereof so as to be axially spaced apart from each other at equal intervals, each of the annular grooves comprising a tapered surface of which the diameter gradually decreases toward the front end of the plunger, and an engaging surface extending from the small-diameter front end of the tapered surface toward the front end of the plunger, the ring-receiving groove including a locking surface at a rear portion thereof, the locking surface and the engaging surface of any of the annular grooves being capable of trapping the register ring therebetween, thereby preventing the plunger from retracting into the cylinder chamber, the plurality of annular grooves including a first annular groove located nearest to the front end of the plunger, the plunger being formed with an outer cylindrical surface extending from the first annular groove toward the front end of the plunger, the outer cylindrical surface having an axial length determined such that with the register ring trapped between the engaging surface of the first annular groove and the locking surface of the ring-receiving groove, the outer cylindrical surface has its front portion slidably supported by an inner cylindrical surface formed on an inner periphery of the cylinder chamber to extend from the ring-receiving groove toward the front opening of the housing.

With this arrangement, when the plunger moves back and forth under the tension of the chain with the register ring received in the first annular groove, the outer cylindrical surface of the plunger extending between the first annular groove and the front end of the plunger is always slidably guided by the inner cylindrical surface of the cylinder chamber extending forwardly from the ring-receiving groove. Thus, even when the plunger is pushed into the housing by the chain guide under the tension of the chain with the register ring received in the first annular groove, the plunger will not incline. This minimizes the wear of the sliding surfaces of the cylinder chamber and the plunger. Since the plunger does not incline relative to the register ring, either, the register ring operates smoothly.

In a preferred arrangement, a set surface is defined between the small-diameter portion and the outer cylindrical surface, and the ring-receiving groove includes a stop surface at its front portion. With this arrangement, the set surface and the stop surface can trap the register ring therebetween, thereby keeping the plunger pushed in the cylinder chamber. Thus, the chain tensioner can be mounted more easily.

Preferably, the small-diameter portion of the plunger is formed with a pin hole diametrically extending therethrough, and wherein the housing is formed with set holes diametrically extending therethrough near the front end thereof, the set holes being aligned with each other and configured to be aligned with the pin hole when the plunger is pushed into the cylinder chamber, the chain tensioner further comprising a set pin which can be inserted through the set holes and the pin hole with the set holes and the pin hole aligned with each other, the set pin having such a length as to interfere with an engine cover of an engine having an engine block if the engine cover is mounted on the engine block with the chain tensioner mounted on the engine block and the set pin inserted through the set holes and the pin hole.

With this arrangement, if an operator forgets to remove the set pin after mounting the chain tensioner, the operator will be unable to mount the engine cover on the engine block because the set pin interferes with the engine cover. This reminds the operator to remove the set pin.

Preferably, the set holes and the pin hole are arranged in a positional relationship such that with the register ring trapped between the set surface of the plunger and the stop surface of the ring-receiving groove, the pin hole is displaced axially rearwardly from the set holes. With this arrangement, with the set pin inserted through the set holes and the pin hole, the set surface is offset toward the opening of the cylinder chamber from the stop surface of the ring-receiving groove. Thus, when the set pin is pulled out of the set holes and the pin hole, the set surface will not engage the ring portion of the register ring, ensuring the release of the plunger.

From another aspect of the invention, there is provided a chain tensioner comprising a housing defining a cylinder chamber having an opening at a front end of the housing and configured to be mounted on an engine block, a plunger slidably mounted in the cylinder chamber and having a constant diameter over the entire axial length thereof, a spring mounted in the cylinder chamber and biasing the plunger out of the cylinder chamber through the opening, and a resiliently and radially deformable register ring received in a ring-receiving groove formed in an inner periphery of the cylinder chamber near the opening, the plunger having a plurality of annular grooves formed in an outer periphery thereof so as to be axially spaced apart from each other at equal intervals, each of the annular grooves comprising a tapered surface of which the diameter gradually decreases toward the front end of the plunger, and an engaging surface extending from the small-diameter front end of the tapered surface toward the front end of the plunger, the ring-receiving groove including a locking surface at a rear portion thereof, the locking surface and the engaging surface of any of the annular grooves being capable of trapping the register ring therebetween, thereby preventing the plunger from retracting into the cylinder chamber, the plurality of annular grooves including a first annular groove located nearest to the front end of the plunger, the plunger having a set groove formed in an outer periphery thereof at its portion displaced from the first annular groove toward a front end of the plunger, the set groove having a depth smaller than the wire diameter of the register ring and being capable of retaining the register ring therein, the plunger being further formed with an outer cylindrical surface extending from the set groove toward the front end of the plunger, the outer cylindrical surface having an axial length determined such that with the register ring trapped between the engaging surface of the first annular groove and the locking surface of the ring-receiving groove, the outer cylindrical surface is slidably supported by an inner cylindrical surface formed on an inner periphery of the cylinder chamber to extend from the ring-receiving groove toward the front opening of the housing, the set groove having an axial width that is smaller than the axial length of the inner cylindrical surface.

With this arrangement, too, when the plunger moves back and forth under the tension of the chain with the register ring received in the first annular groove, the outer cylindrical surface of the plunger extending between the set groove and the front end of the plunger is always slidably guided by the inner cylindrical surface of the cylinder chamber extending forwardly from the ring-receiving groove.

This minimizes the wear of the sliding surfaces of the cylinder chamber and the plunger. The register ring operates smoothly, too.

BRIEF DESCRIPTION OF THE DRAWINGS

Other features and objects of the present invention will become apparent from the following description made with reference to the accompanying drawings, in which:

FIG. 5 is a partial enlarged sectional view of FIG. 4;

FIGS. 6A and 6B are partial sectional views of two different chain tensioners which have a potential problem resulting from the positional relationship between a stop surface and a pin hole;

DETAILED DESCRIPTION OF THE PREFERRED EMBODIMENTS

Figure 1:
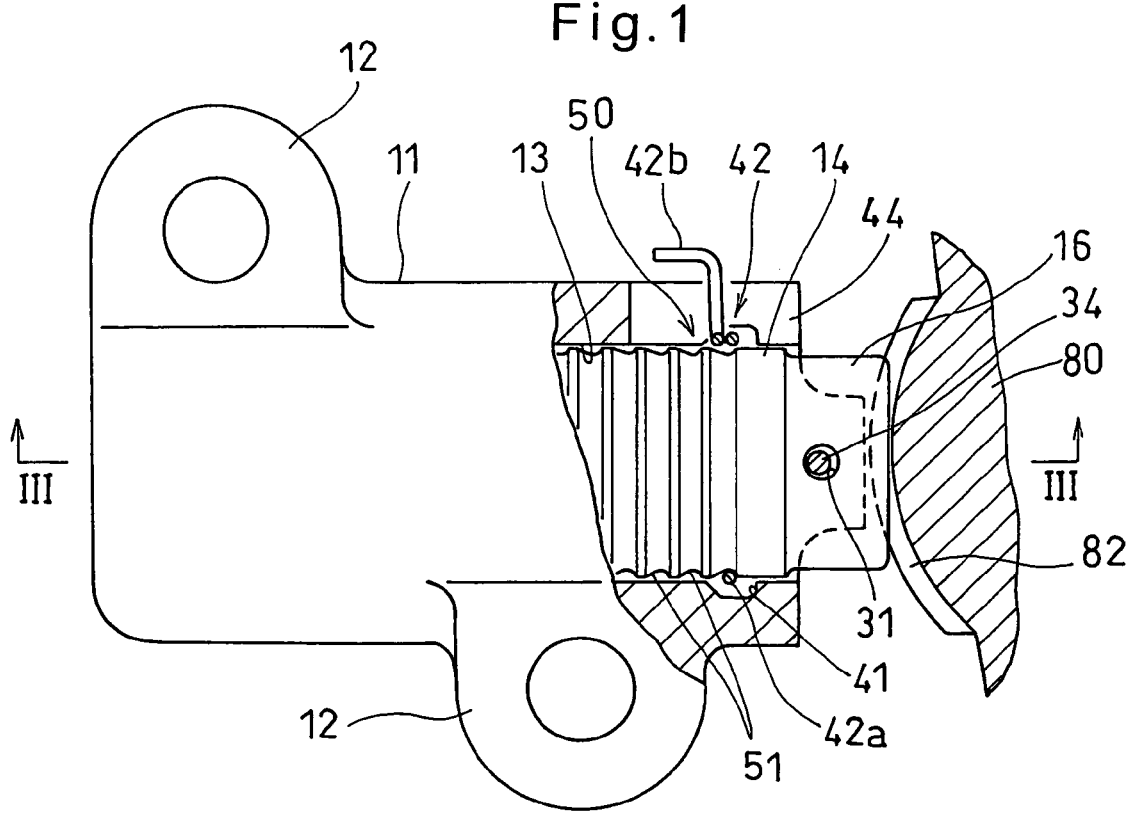
FIG. 1 is a partially cutaway front view of a chain tensioner embodying the present invention.

Now referring to the drawings, the chain tensioner shown in FIG. 1 includes a housing 11 having a plurality of mounting pieces 12 which are bolted to an engine block 1.

Figure 3:
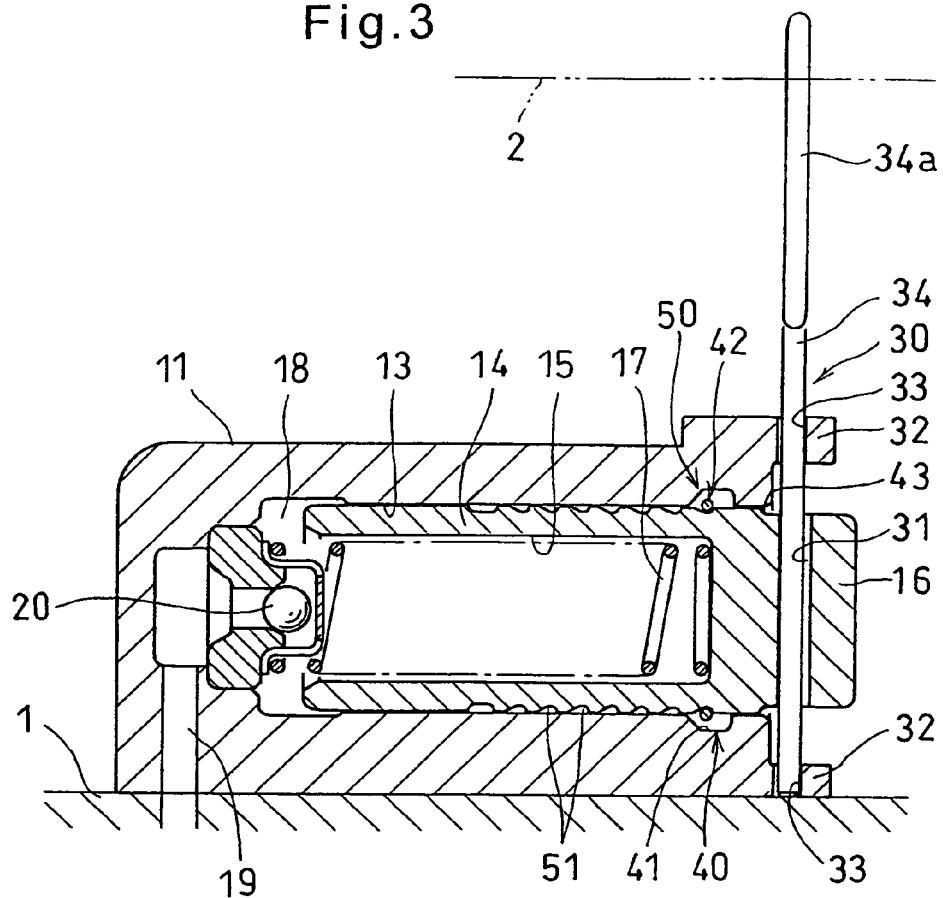
FIG. 3 is a sectional view taken along line III-III of FIG. 1.

As shown in FIG. 3, the housing 11 defines a cylinder chamber 13 having an opening at one end of the housing 11. A plunger 14 is slidably mounted in the cylinder chamber 13.

Figure 11:
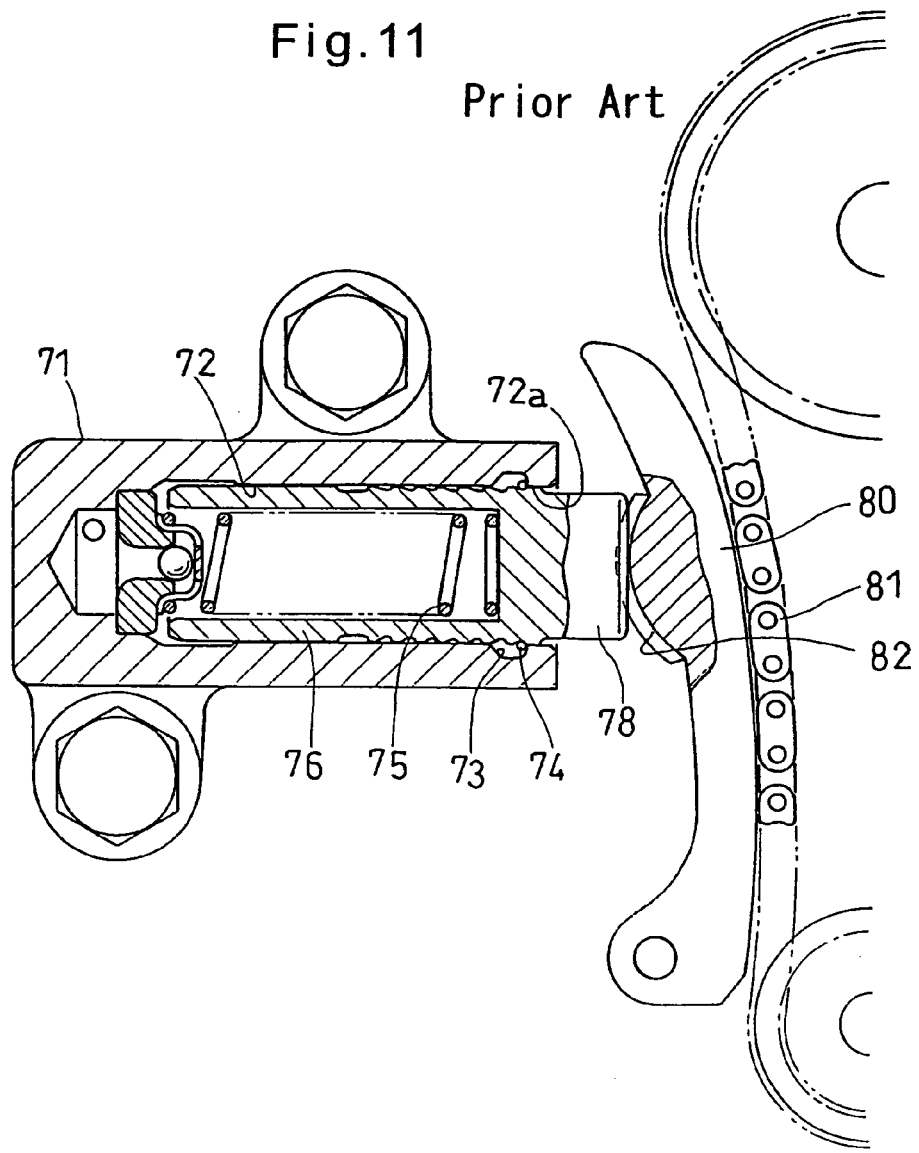
FIG. 11 is a vertical sectional front view of a conventional chain tensioner.
Figure 12:
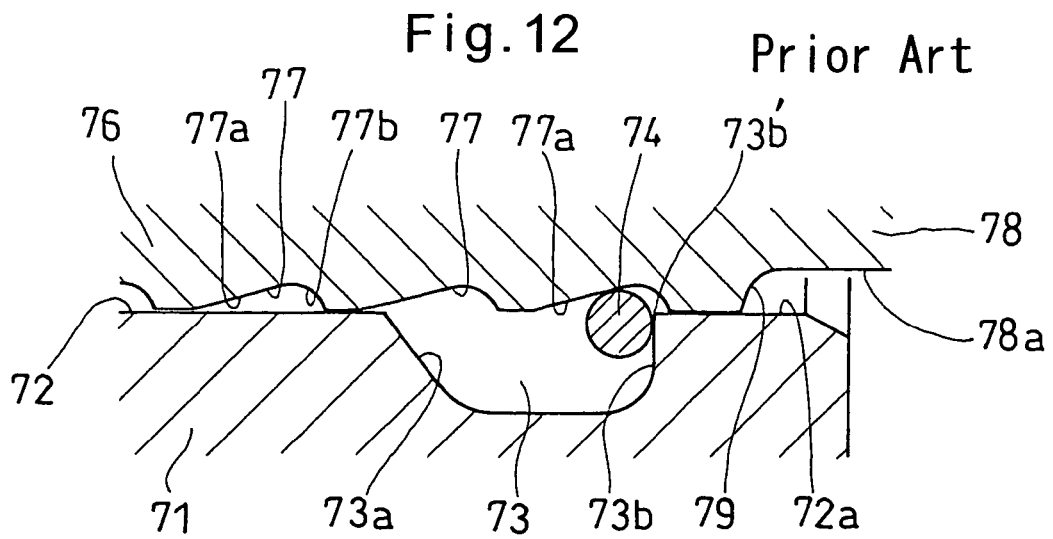
FIG. 12 is a partial enlarged sectional view of FIG. 11.
Figure 13:
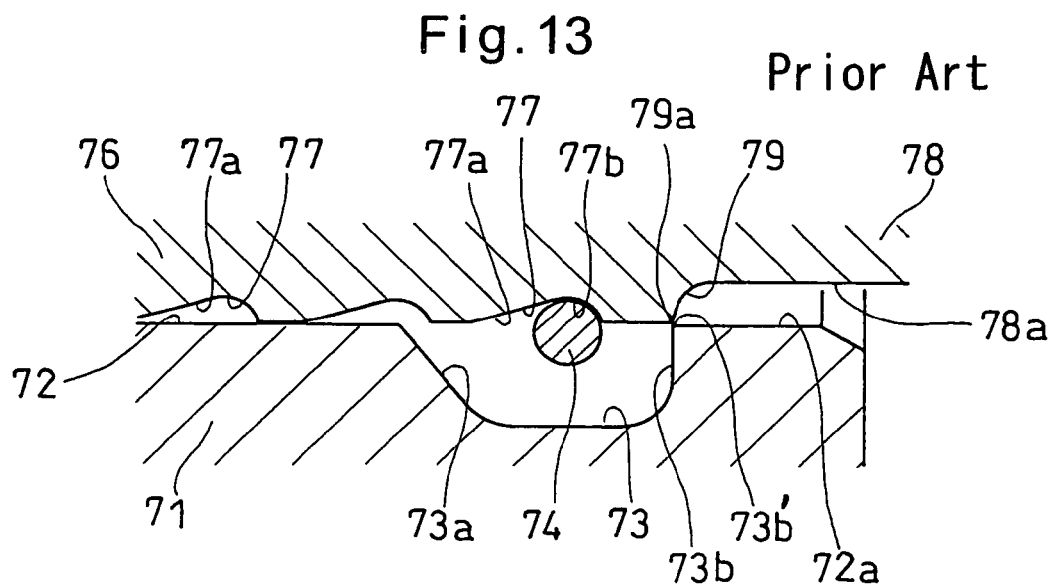
FIGS. 13 and 14 are partial sectional views of the chain tensioner of FIG. 11, showing states in which the chain is being tensioned in a controlled manner by the chain tensioner.
Figure 14:
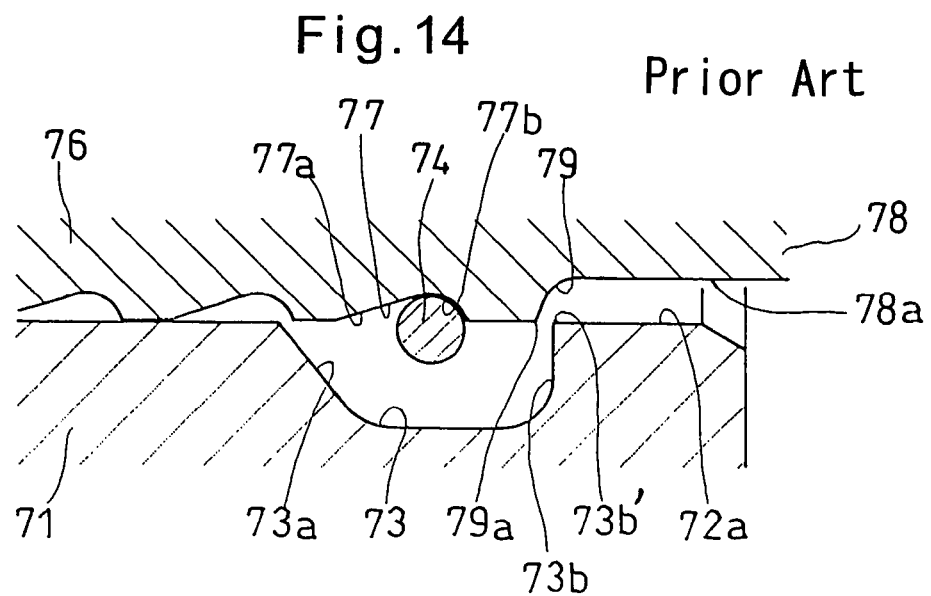

The plunger 14 is formed with a bore 15 having an opening at the rear end of the plunger 14, and includes a small-diameter portion 16 at its front end. The small-diameter portion 16 is received in the guide groove 82 formed in the plunger abutment of the chain guide 80 shown in FIG. 11 to prevent the chain guide 80 from moving laterally (transverse to the guide groove 82). Since the chain guide 80 is shown in FIG. 11, only its plunger abutment is shown in FIG. 1. A spring 17 is mounted between the closed end of the bore 15 and the closed end of the cylinder chamber 13 to bias the plunger 14 out of the cylinder chamber 13.

The plunger 14 defines a damper chamber 18 in the housing 11. The housing 11 is formed with an oil supply passage 19 communicating with the damper chamber 18. A check valve 20 is mounted at the outlet of the oil supply passage 19. When the hydraulic oil pressure in the damper chamber 18 exceeds the pressure of hydraulic oil supplied through the oil supply passage 19, the check valve 20 closes the oil supply passage 19, thereby preventing hydraulic oil in the damper chamber 18 from flowing back into the oil supply passage 19.

Between the housing 11 and the plunger 14, a first plunger retaining arrangement 30 and a second plunger retaining arrangement 40 are provided to keep the plunger 14 pushed into the cylinder chamber.

Figure 4:
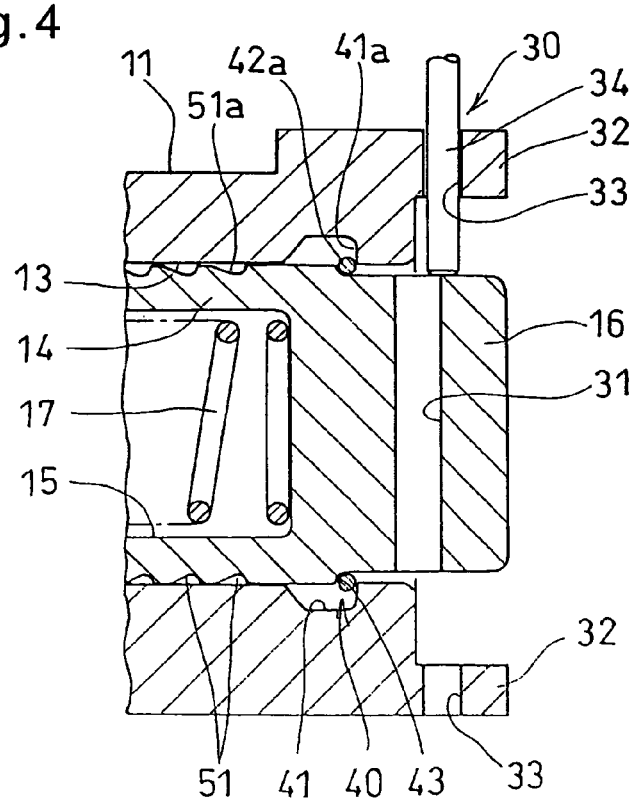
FIG. 4 is a sectional view of a portion of the chain tensioner of FIG. 1, showing the state in which a plunger is kept pushed in a housing by a register ring.

As shown in FIGS. 3 and 4, the first plunger retaining arrangement 30 comprises a diametric pin hole 31 formed in the small-diameter portion 16 of the plunger 14, a pair of diametrically opposed support pieces 32 formed at the open end of the housing 11 and formed with set holes 33, and a set pin 34 which can be inserted through the set holes 33 and the pin hole 31 to keep the plunger pushed into the cylinder chamber.

Figure 2:
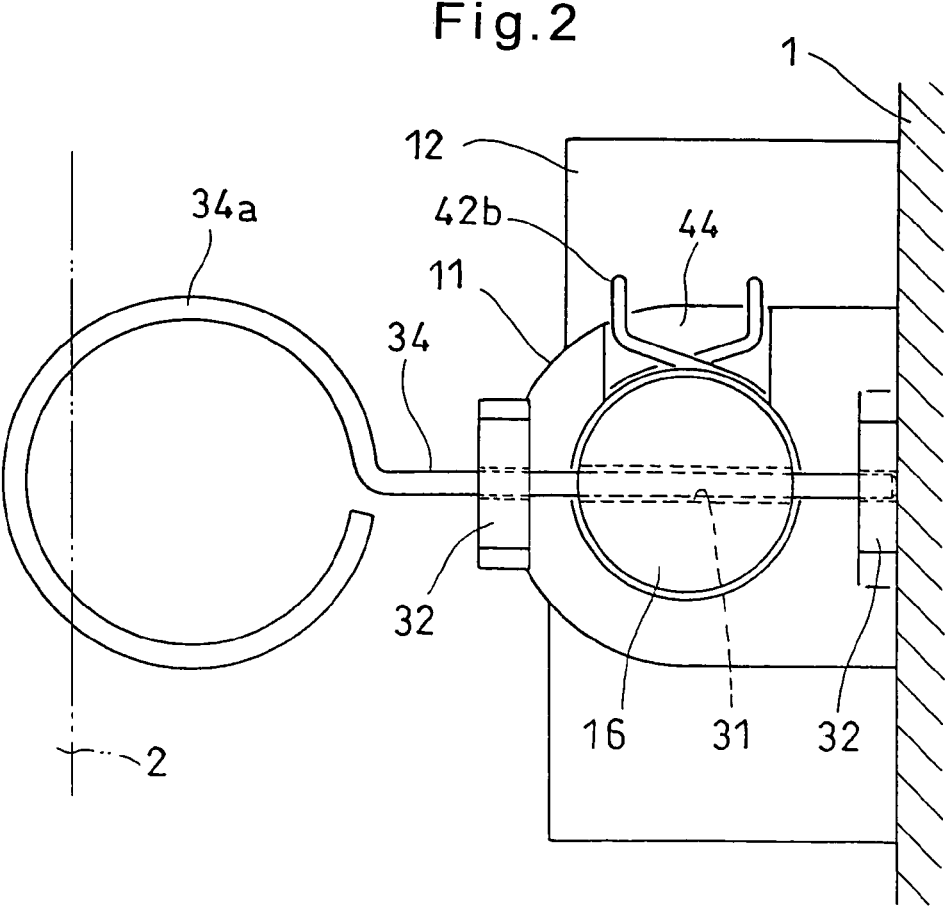
FIG. 2 is a right-hand side view of FIG. 1.

As shown in FIGS. 2 and 3, the set pin 34 has a ring portion 34a into which a finger can be inserted, and has such a length that in the initial set state in which the set pin 34 is inserted through the set holes 33 and the pin hole 31, an engine cover 2 mounted on the engine block will interfere with the ring portion 34a.

As shown in FIGS. 3 and 4, the second plunger retaining arrangement 40 comprises a ring-receiving groove 41 formed in the inner wall of the cylinder chamber 13 near its open end and having a stop surface 41a at its end near the open end of the cylinder chamber 13, a register ring 42 having a radially and resiliently deformable ring portion 42a received in the ring-receiving groove 41, and a set surface 43 formed on the plunger 14 at the root of its small-diameter portion 16. With the plunger 14 pushed into the cylinder chamber 13, the ring portion 42a of the register ring 42 is trapped between the set surface 43 and the stop surface 41a, thereby keeping the plunger 14 pushed into the cylinder chamber 13.

As shown in FIGS. 1 and 2, the register ring 42 has a pair of extensions 42b extending from the respective ends of the ring portion 42a. The extensions 42b extend through a cutout 44 formed in the housing 11 near its open end and protrude from the housing 11. By pushing the protruding ends of the extensions 42b toward each other, it is possible to expand the ring portion 42a.

If the positional relation between the set surface 43 and the pin hole 31 is determined such that with the set pin 34 inserted through the set holes 33 and the pin hole 31, the ring portion 42a of the register ring 42 is disposed between the set surface 43 and the stop surface 41a of the ring-receiving groove 41 as shown in FIG. 6A, and when the set pin 34 is pulled out of the set holes 33 and the pin hole 31, the ring portion 42a of the register ring 42 will get trapped between the stop surface 41a and the set surface 43 when the plunger 14 advances only for a short distance, thus making it impossible for the plunger 14 to advance any further.

On the other hand, as shown in FIG. 6B, if the positional relation between the set surface 43 and the pin hole 31 is determined such that with the set pin 34 inserted through the set holes 33 and the pin hole 31, the ring portion 42a of the register ring 42 is trapped between the stop surface 41a of the ring-receiving groove 41 and the set surface 43, the set pin 34 may slip out of the set holes 33 and the pin hole 31 during e.g. transportation of the chain tensioner alone.

In order to solve these problems, according to the present invention, the positional relation between the set surface 43 and the pin hole 31 is determined as shown in FIG. 4.

Specifically, the positional relation between the set surface 43 and the pin hole 31 is determined such that with the ring portion 42a of the register ring 42 trapped between the set surface 43 and the stop surface 41a of the ring-receiving groove 41, the pin hole 31 is offset rearwardly from the set holes 33.

Between the housing 11 and the plunger 14, a retraction restricting arrangement 50 is provided for restricting the retraction of the plunger 14 to a predetermined amount.

Figure 7:
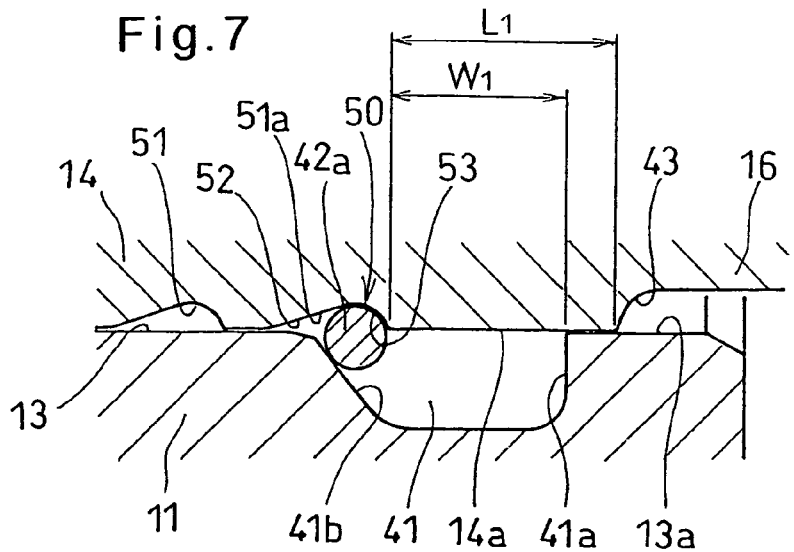
FIG. 7 is a partial sectional enlarged view of the chain tensioner of FIG. 1, showing the state in which the register ring is trapped between an engaging surface of a first annular groove and a locking surface of a ring-receiving groove.

As shown in FIG. 7, the retraction restricting arrangement 50 comprises the ring-receiving groove 41, the register ring 42, and a plurality of annular grooves 51 formed in the outer periphery of the plunger 14. The ring portion 42a of the register ring 42 is adapted to be press-fitted in any of the annular grooves 51. Each annular groove 51 comprises a rear tapered surface 52 of which the diameter gradually decreases toward the front end of the plunger 14, and an engaging surface 53 extending from the front, small-diameter end of the tapered surface 52. When the plunger 14 retracts, the ring portion 42a of the register ring 42 gets trapped between a locking surface 41b formed at the rear end of the ring-receiving groove 41 and the engaging surface 53 of the annular groove 51, thereby preventing any further retraction of the plunger 14.

As shown in FIG. 7, a cylindrical surface 14a is formed on the outer periphery of the plunger 14 between the frontmost one of the annular grooves 51 (which is hereinafter referred to as the first annular groove 51a) and the set surface 43. This cylindrical surface 14a has an axial length $L_1$ which is greater than the distance $W_1$ between the first annular groove 51a and the s top surface 41a of the ring-receiving groove 41 with the ring portion 42a of the register ring 42 trapped between the engaging surface 53 of the first annular groove 51a and the locking surface 41b of the ring-receiving groove 41.

To mount the chain tensioner of this embodiment on the engine block 1, with the set pin 34 inserted through the set holes 33 and the pin hole 34 to keep the plunger 14 pushed in the housing 11 as shown in FIG. 3, the mounting pieces 12 of the housing 11 are bolted to the engine block 1.

With the chain tensioner thus mounted on the engine block 1, the set pin 34 is pulled out to allow the plunger 14 to protrude outwardly. The plunger 14 thus presses the pivotable chain guide 80 against the chain.

If an operator forgets to remove the set pin 34 after mounting the chain tensioner, the chain tensioner will be incapable of performing its expected function. But according to the present invention, the set pin 34 has such a length that it will interfere with the engine cover 2 when the operator attempts to mount the engine cover 2 with the chain tensioner mounted on the engine block 1. Thus, if the set pin 34 is left unremoved from the tensioner, the operator will be unable to mount the engine cover, so that he will never forget to remove the set pin 34.

Also, since the positional relation between the set surface 43 and the pin hole 31 is determined such that with the set pin 34 inserted through the set holes 33 and the pin hole 31, the ring portion 42a of the register ring 42 is fitted on the plunger 14 at its portion axially displaced from the set surface 43 toward the rear end of the plunger 14, when the set pin 34 is pulled out, the ring portion 42a of the register ring 42 will not get trapped between the stop surface 41a of the ring-receiving groove 41 and the set surface 43. Thus, simply by pulling out the set pin 34, the plunger 14 becomes free to protrude.

Thus, the chain tensioner can be reliably mounted in such a way that it can fully perform its expected function.

With the chain tensioner mounted and the set pin removed, hydraulic oil is supplied through the oil supply passage 19 into the damper chamber 18 until the damper chamber 18 is filled with hydraulic oil to keep a constant tension in the chain.

It is supposed here that the chain is being driven by the crankshaft with the ring portion 42a of the register ring 42 fitted in the frontmost one of the plurality of annular grooves 51, i.e. the first annular groove 51a. Due to vibrations of the chain resulting from fluctuations in angular speed of the crankshaft and fluctuations in torque from camshafts during each rotation of the crankshaft, a force that tends to push the plunger 14 into the housing acts on the plunger 14 when the tension in the chain increases. This force is dampened by the hydraulic oil in the damper chamber 18.

When the chain slackens, the plunger 14 will quickly protrude from the housing under the force of the spring 17, thereby re-tensioning the chain.

When the plunger 14 repeatedly advances and retracts under fluctuating tension in the chain, the ring portion 42a of the register ring 42 will move in the ring-receiving groove 41. When the plunger 14 is pushed into the housing, the ring portion 42a of the register ring 42 is pushed rearwardly by the engaging surface 53 of the first annular groove 51a until the ring portion 42a engages the locking surface 41b of the ring-receiving groove 41 as shown in FIG. 7. Once the ring portion 42a engages the locking surface 41b, the plunger 14 cannot retract any further.

In this state, because the length $L_1$ is greater than the distance $W_1$, the cylindrical surface 14a of the plunger 14 between the first annular groove 51a and the set surface 43 has its front end portion supported on the cylindrical surface 13a of the cylinder chamber 13 between the ring-receiving groove 41 and the open end of the cylinder chamber 13.

Thus, when the ring portion 42a of the register ring 42 repeatedly moves back and forth in the ring-receiving groove 41 while being fitted in the first annular groove 51a, the cylindrical surface 14a of the plunger 14 will be always supported, at least at its front portion, on the cylindrical surface 13a of the cylinder chamber 13. This prevents the plunger 14 from inclining in the cylinder chamber 13.

Since the plunger 14 is prevented from inclining in the cylinder chamber 13, the plunger 14 can smoothly slide axially in the cylinder chamber. This minimizes wear of the sliding surfaces of the cylinder chamber 13 and the plunger 14. Also, because the plunger 14 does not incline relative to the register ring 42, either, the register ring 42 can fully perform its function.

When the plunger 14 advances, the ring portion 42a of the register ring 42 moves together with the plunger 14 until it abuts the stop surface 41a of the ring-receiving groove 41. When the plunger 14 advances further, the ring portion 42a will slide along the tapered surface 52 of the first annular groove 51a while expanding radially outwardly. When the plunger advances by a distance greater than the pitch of the annular grooves 51, the ring portion 42a of the register ring 42 will fit into the next annular groove 51.

If the force that tends to push the plunger 14 into the cylinder chamber 13 is greater than the force of the spring 17, the plunger 14 will retract until the ring portion 42a of the register ring 42 gets trapped between the locking surface 41b of the ring-receiving groove 41 and the engaging surface 53. From this position, the plunger 14 cannot retract any further.

Thus, even if the engine is stopped with the chain tensioned according to the position of the cams when the engine stops, the plunger 14 will never retract once the ring portion 42a gets trapped between the locking surface 41b and the engaging surface 53. This prevents the chain from slackening markedly immediately after the engine has been restarted.

If it is necessary to dismount the chain tensioner for the maintenance of the chain tensioner itself or engine parts, with the ring portion 42a of the register ring 42 expanded radially by pushing its extensions 42b toward each other, the plunger 14 is pushed into the cylinder chamber 13 until the set surface 43 of the plunger 14 is located in the rear of the ring portion 42a. Then, the extensions 42b are released to let the ring portion 42a become press-fitted on the small-diameter portion 16 of the plunger 14. In this state, the plunger 14 is released. When the plunger 14 is released, the plunger advances until the ring portion 42a gets trapped between the set surface 43 of the plunger 14 and the stop surface 41a of the ring-receiving groove 41 as shown in FIG. 4.

Since the plunger 14 is kept pushed in the housing by the register ring 42, the chain tensioner can be easily re-mounted on the engine block 1.

Figure 8:
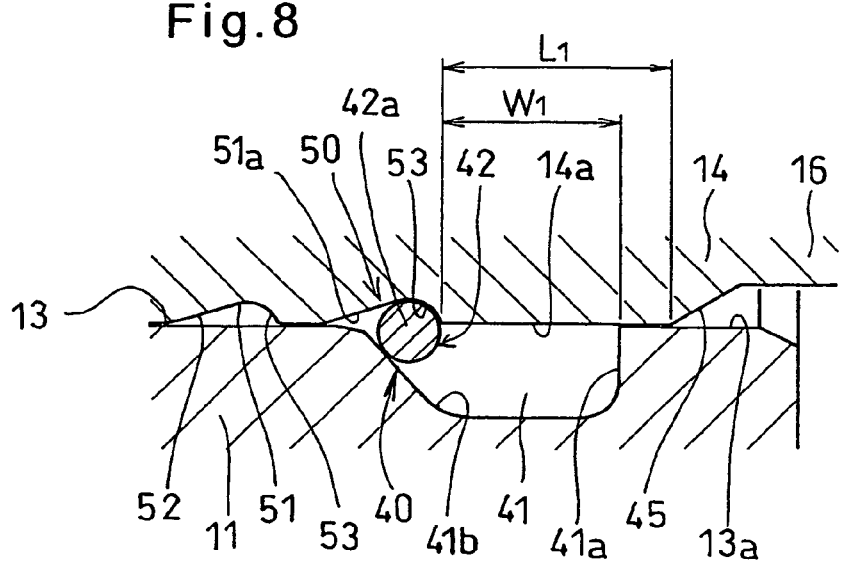
FIG. 8 is a partial sectional enlarged view of a chain tensioner according to another embodiment of the present invention.

FIG. 8 shows a chain tensioner according to the second embodiment of the invention. In this embodiment, the plunger 14 is formed with a tapered surface 45 instead of the set surface 43 formed in the plunger of the chain tensioner of the first embodiment. In this embodiment, too, with the ring portion 42a of the register ring 42 trapped between the engaging surface 53 of the first annular groove 51a and the locking surface 41b of the ring-receiving groove 41, the outer cylindrical surface 14a of the plunger 14 extending between the first annular groove 51a and the tapered surface 45 has an axial length $L_1$ that is greater than the distance $W_1$ between the first annular groove 51a and the stop surface 41a of the ring-receiving groove 41.

Thus, in this embodiment, too, when the ring portion 42a of the register ring 42 repeatedly moves back and forth in the ring-receiving groove 41 while being fitted in the first annular groove 51a, the cylindrical surface 14a of the plunger 14 will be always supported, at least at its front portion, on the cylindrical surface 13a of the cylinder chamber 13. This prevents the plunger 14 from inclining in the cylinder chamber 13, so that the plunger 14 can be smoothly moved in the axial direction.

Figure 9:
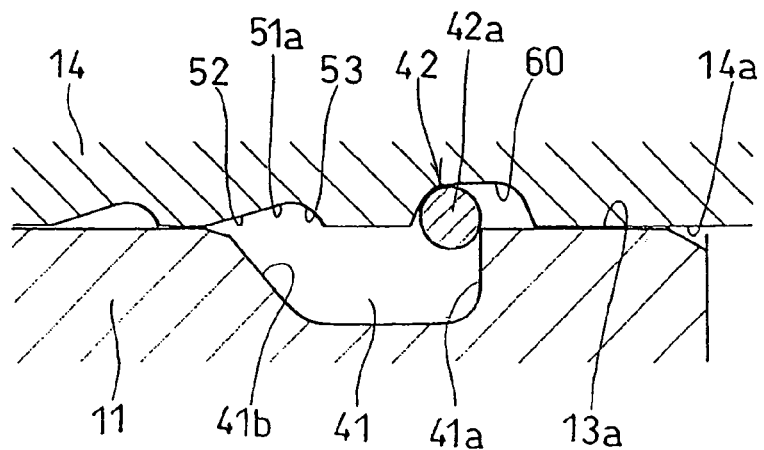
FIG. 9 is a partial sectional enlarged view of a chain tensioner according to still another embodiment of the present invention.
Figure 10:
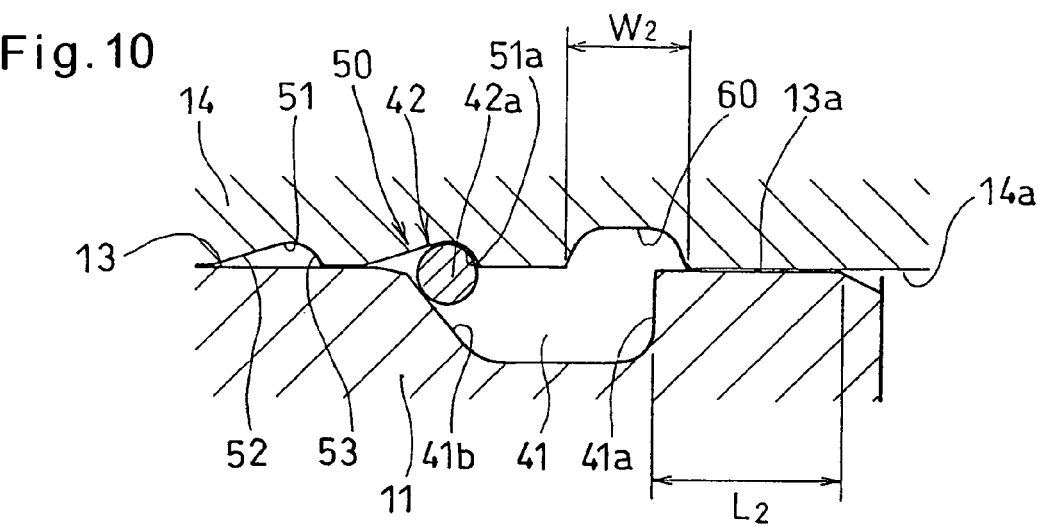
FIG. 10 is a partial sectional enlarged view of the chain tensioner of FIG. 9, showing the state in which the register ring is trapped between the engaging surface of the first annular groove and the locking surface of the ring-receiving groove.

FIGS. 9 and 10 show still another chain tensioner embodying the invention. This embodiment differs from the embodiment of FIGS. 1 to 3 in that the plunger 14 has a constant diameter over the entire axial length thereof, except that the annular grooves 51 are provided and that a set groove 60 that is smaller in depth than the wire diameter of the register ring 42 is formed in the outer surface of the plunger 14 between the first annular groove 51a and the front end of the plunger.

Thus, elements identical to those shown in FIGS. 1 to 3 are denoted by identical numerals and their description is omitted.

In this embodiment, as shown in FIG. 10, an outer cylindrical surface 14a of the plunger extending between the set groove 60 and the front end of the plunger has an axial length determined such that with the ring portion 42a of the register ring 42 trapped between the engaging surface 53 of the first annular groove 51a and the locking surface 41b of the ring-receiving groove 41, the outer cylindrical surface 14a is supported on an inner cylindrical surface 13a of the cylinder chamber 13 extending between the ring-receiving groove 41 and the front open end of the cylinder chamber 13. Also, the set groove 60 has a width (axial dimension) $W_2$ that is shorter than the axial length $L_2$ of the cylindrical surface 13a.

With this arrangement, when the ring portion 42a of the register ring 42 repeatedly moves back and forth in the ring-receiving groove 41 while being fitted in the first annular groove 51a under the forces applied to the plunger from opposite directions, the cylindrical surface 14a of the plunger 14 will be always supported on the cylindrical surface 13a of the cylinder chamber 13. This prevents the plunger 14 from inclining in the cylinder chamber 13. Since the plunger 14 is prevented from inclining in the cylinder chamber 13, the plunger 14 can smoothly slide axially in the cylinder chamber. This minimizes wear of the sliding surfaces of the cylinder chamber 13 and the plunger 14. Also, because the plunger 14 does not incline relative to the register ring 42, either, the register ring 42 can fully perform its function.

In this embodiment, by bringing the stop surface 41a of the ring-receiving groove 41 into engagement with the ring portion 42a of the register ring 42 with the ring portion 42a received in the set groove 60 as shown in FIG. 9, the plunger 14 can be kept pushed in the cylinder chamber. The chain tensioner can thus be easily mounted.

What is claimed is:

1. A chain tensioner comprising a housing defining a cylinder chamber having an opening at a front end of said housing and configured to be mounted on an engine block, a plunger slidably mounted in said cylinder chamber and having a small-diameter portion at a front end thereof, a spring mounted in said cylinder chamber and biasing said plunger out of said cylinder chamber through said opening, and a resiliently and radially deformable register ring received in a ring-receiving groove formed in an inner periphery of said cylinder chamber near said opening, said plunger having a plurality of annular grooves formed in an outer periphery thereof so as to be axially spaced apart from each other at equal intervals, said plurality of annular grooves including a first annular groove constituted by a frontmost annular groove of said plurality of annular grooves, each of said annular grooves comprising a tapered surface of which the diameter gradually decreases toward the front end of said plunger, and an engaging surface extending from the small-diameter front end of said tapered surface toward the front end of said plunger, said ring-receiving groove including a locking surface at a rear portion thereof, said locking surface and said engaging surface of any of said annular grooves being capable of trapping said register ring therebetween, thereby preventing said plunger from retracting into said cylinder chamber, said plunger being formed with an outer cylindrical surface having a substantially uniform outer diameter over an entirety of an axial length of the outer cylindrical surface extending from said first annular groove toward the front end of said plunger, said outer cylindrical surface having said axial length thereof determined such that, with said register ring trapped between said engaging surface of said first annular groove and said locking surface of said ring-receiving groove, said outer cylindrical surface has its front portion slidably supported by an inner cylindrical surface formed on an inner periphery of said cylinder chamber to extend from said ring-receiving groove toward the front opening of said housing.

2. The chain tensioner of claim 1 wherein a set surface is defined between said small-diameter portion and said outer cylindrical surface, and wherein said ring-receiving groove includes a stop surface at its front portion, said set surface and said stop surface being capable of trapping said register ring therebetween, thereby keeping said plunger pushed in said cylinder chamber.

3. The chain tensioner of claim 1 wherein said small-diameter portion of said plunger is formed with a pin hole diametrically extending therethrough, and wherein said housing is formed with set holes diametrically extending therethrough near the front end thereof, said set holes being aligned with each other and configured to be aligned with said pin hole when said plunger is pushed into said cylinder chamber, said chain tensioner further comprising a set pin which can be inserted through said set holes and said pin hole with said set holes and said pin hole aligned with each other, said set pin having such a length as to interfere with an engine cover of an engine having an engine block if the engine cover is mounted on the engine block with said chain tensioner mounted on the engine block and said set pin inserted through said set holes and said pin hole.

4. The chain tensioner of claim 2 wherein said small-diameter portion of said plunger is formed with a pin hole diametrically extending therethrough, and wherein said housing is formed with set holes diametrically extending therethrough near the front end thereof, said set holes being aligned with each other and configured to be aligned with said pin hole when said plunger is pushed into said cylinder chamber, said chain tensioner further comprising a set pin which can be inserted through said set holes and said pin hole with said set holes and said pin hole aligned with each other, said set pin having such a length as to interfere with an engine cover of an engine having an engine block if the engine cover is mounted on the engine block with said chain tensioner mounted on the engine block and said set pin inserted through said set holes and said pin hole.

5. The chain tensioner of claim 4 wherein said set holes and said pin hole are arranged in a positional relationship such that with said register ring trapped between said set surface of said plunger and said stop surface of said ring-receiving groove, said pin hole is displaced axially rearwardly from said set holes.

6. A chain tensioner comprising a housing defining a cylinder chamber having an opening at a front end of said housing and configured to be mounted on an engine block, a plunger slidably mounted in said cylinder chamber, a spring mounted in said cylinder chamber and biasing said plunger out of said cylinder chamber through said opening, and a resiliently and radially deformable register ring received in a ring-receiving groove formed in an inner periphery of said cylinder chamber near said opening, said plunger having a plurality of annular grooves formed in an outer periphery thereof so as to be axially spaced apart from each other at equal intervals, each of said annular grooves comprising a tapered surface of which the diameter gradually decreases toward the front end of said plunger, and an engaging surface extending from the small-diameter front end of said tapered surface toward the front end of said plunger, said ring-receiving groove including a locking surface at a rear portion thereof, said locking surface and said engaging surface of any of said annular grooves being capable of trapping said register ring therebetween, thereby preventing said plunger from retracting into said cylinder chamber, said plurality of annular grooves including a first annular groove located nearest to the front end of said plunger, said plunger having a set groove formed in an outer periphery thereof at its portion displaced from said first annular groove toward a front end of said plunger, said set groove having a depth smaller than the wire diameter of said register ring and being capable of retaining said register ring therein, an outer diameter of said plunger other than where said set groove and said annular grooves are formed being constant over an entire axial length of the outer cylindrical surface of said plunger, said plunger being further formed with an outer cylindrical surface extending from said set groove toward the front end of said plunger, said outer cylindrical surface having an axial length determined such that, with said register ring trapped between said engaging surface of said first annular groove and said locking surface of said ring-receiving groove, said outer cylindrical surface is slidably supported by an inner cylindrical surface formed on an inner periphery of said cylinder chamber to extend from said ring-receiving groove toward the front opening of said housing, said set groove having an axial width that is smaller than the axial length of said inner cylindrical surface.

7. The chain tensioner of claim 1 wherein said outer periphery of said plunger has no grooves formed therein forward of said first annular groove.

8. The chain tensioner of claim 1 wherein
said small-diameter portion of said plunger is located forward of said outer cylindrical surface and extends to said front end of said plunger, said small-diameter portion being smaller in diameter than said outer cylindrical surface.

9. The chain tensioner of claim 8 wherein said outer periphery of said plunger has no grooves formed therein forward of said first annular groove.

\* \* \* \* \*